INVENTOR.
WALTER H WILSON
BY Robert A Lavender

Dec. 22, 1953     W. H. WILSON     2,663,142
THERMOJET ENGINE
Filed Dec. 20, 1951                         7 Sheets-Sheet 7

INVENTOR.
WALTER H WILSON
BY Robert A Lavender

Patented Dec. 22, 1953

2,663,142

UNITED STATES PATENT OFFICE 2,663,142

THERMOJET ENGINE

Walter Hobart Wilson, Long Beach, Calif.

Application December 20, 1951, Serial No. 262,544

17 Claims. (Cl. 60—39.71)

1

This invention relates to jet propulsion engines or power plants in general, and more particularly to jet engines having a jet-type air compression means useful in the propulsion of aircraft or other vehicles by the reaction of a rearwardly directed jet of combustion gases.

In the present invention I have developed a method and means of burning liquid fuel, such as propane, gasoline, kerosene, alcohol, etc., and producing therefrom a motive fluid, which may be used for the operation of various types of machinery, heat devices, jet propulsion devices, etc. When used in jet propulsion this method and system provide for a high degree of combustion efficiency, because the high combustion chamber temperature permits ideal fuel-air ratios. As a power plant this invention provides for rugged, economical and reliable operation, as no moving parts are required.

It is essential in reaction jet-type engines that combustion of the fuel occur within a space in which the pressure is considerably higher than the surrounding atmosphere. Some means, therefore, must be provided to supply the air required for combustion into the combustion space against this higher pressure. In the present invention a unique system is provided whereby a plurality of entraining gaseous jets work in conjunction with an impelling jet of products to compress the required air; said impelling jet resulting from the high velocity reactions of an explosive mixture of primary fuel. Inasmuch as this system is dependent upon a thermochemical jet process, I prefer to call this power plant a "thermo-jet" engine. It is the general objective of this invention to provide the means necessary to produce such an engine.

A further object of the invention is to provide a fuel combustion system in which a gaseous motive fluid is generated for use as a jet propulsion means, or for other purposes. Said motive fluid being generated by the combustion of fuel in a combustion chamber into which the fuel is forced in a plurality of high temperature jets, which jets also function as part of the working medium in the air compression means.

Another object of the invention is to provide a power plant of the character referred to, having a coil section and a retort tube disposed within the combustion space in such a manner as to effectively and efficiently induce a reformation of a fuel and water mixture by an endothermic chemical reaction analogous to the common water-gas reaction ($C+H_2O \rightarrow CO+H_2$). This reformed gas, being highly explosive and requiring very little additional oxygen to complete the reverse exothermic reaction, expands as a primary jet to inject air into a divergent nozzle, where it unites and reacts with explosive velocity. The products of this reaction, then, are used as an impelling jet to assist in the compression of

2 air required in the main combustion process. Furthermore, this reformed gas, being high in hydrogen content, is made to supply chain carriers to catalyze the combustion of the main fuel, thereby increasing the rate of flame propagation.

A combination pilot burner and primary injection nozzle operating at high temperature is provided, by means of which this reformed gas is held in equilibrium until its heat is converted to useful work in the beforementioned nozzle.

A further object of this invention is to provide a primary air-injection nozzle in combination with a pilot burner, by means of which a gaseous fuel mixture is made to inject a quantity of atmospheric air sufficient to sustain its own continuous combustion, and in which a pilot flame furnishes constant reliable ignition for the said continuous combustion. The combustion process referred to herein as the primary combustion, being more or less of a reversible endothermic-exothermic process, is not considered as essentially a source of power. No claim is made to obtain energy from the water which forms the principal component of the primary fuel. This primary combustion process is principally a heat transfer cycle, in which a thermochemical process is utilized to furnish most of the energy to compress a sufficient quantity of air for the main fuel combustion, thus eliminating the need for an expensive mechanical compressor.

It is another object of the invention to provide a jet propulsion engine of the character referred to applicable to the propulsion of high speed airborne vehicles, and designed to utilize to the fullest advantage, in combination herewith, the most attractive features of ram jet air compression means; said engine having the advantage of self-starting and being capable of developing static thrust under stationary conditions.

It is a further object of the invention to provide, in combination with a jet propulsion engine, a fuel injection and combustion system utilizing, in combination therewith, the ram jet principle and in addition being readily adaptable to effective and efficient instrument control at varying speeds and altitudes.

It is still a further object of the invention to provide a power plant of the character referred to, and ideally suited for installation on the tips of the rotating wings of helicopters; said power plant having the advantage of self-starting and efficient operation, and also being economical in fuel consumption at varying speeds.

These and other objects and features described later will become evident hereinafter in the description, which together with the drawings, illustrate preferred embodiments of the invention.

The present invention is capable of embodiment in power plants, and heat devices varying in character and application. In the following description the invention will be disclosed as it would be formed for use in a jet propulsion system; useful in the propulsion of aircraft and the like, it being understood that this is not to be construed as limiting either the scope or application of the invention.

The power plant of this invention comprises a combination of the following principal elements: a cylindrically formed body or shell enclosing an air inlet; a pilot burner; an air injection and compression means; a combustion chamber section; heat transfer coils and an exit jet propulsion nozzle.

The shell or body consists of two sections, the forward-section enclosing the air injection and compression means; the after-section enclosing the combustion chamber and exit nozzle means. Both sections of the shell are flanged longitudinally to permit easy access and assembly. The spirally-wound coils are disposed axially in the after and larger section of the shell, while the air injection nozzle means is disposed axially in the forward section. Both coils and nozzles are so arranged as to have freedom of movement in the thermal expansion. The double layers of coils, together with the tubular exit nozzle are arranged to completely insulate the body shell from the combustion heat.

Figure 1:
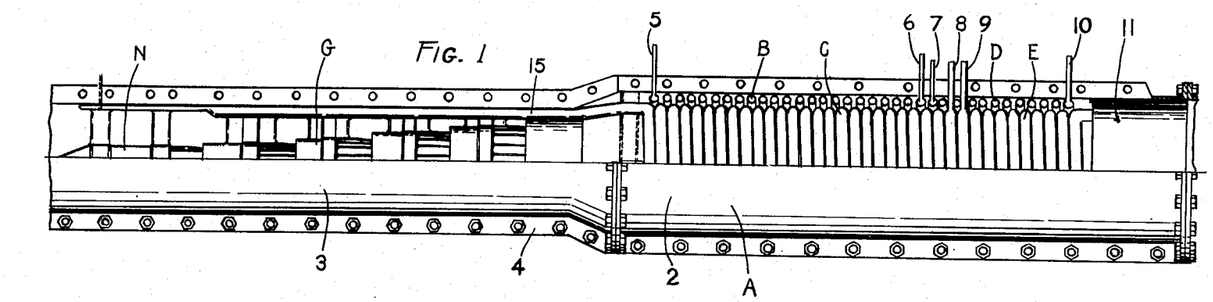
Figure 1 is a horizontal view of a jet propulsion unit with parts of the housing shell, and part of the coil section removed.
Figure 2:
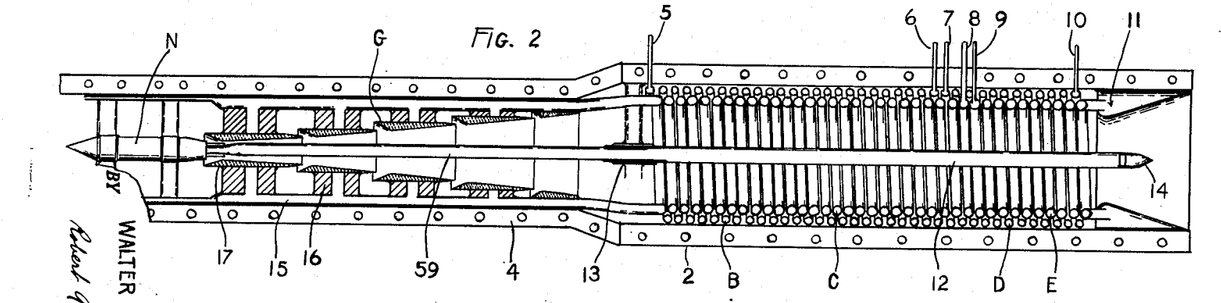
Figure 2 is a horizontal section of a jet propulsion unit with the primary nozzle in perspective.

In Figure 1 the combustion chamber housing 2 is partly removed and the outside coil sections B and D are cut away to expose a view of the inner coil sections C and E. The forward part of the body shell referred to as nozzle housing 3 is also partly removed to show primary nozzle N, main fuel and air injection nozzle means G and main fuel supply manifold pipes 15. Figure 2 is the same unit as is shown in Figure 1, but with the body shell separated at flanges 4 and with the exposed elements shown more in section. The heat transfer coils enclosing the combustion chamber space are here shown divided into four sections. These sections are concentrically formed of heat-resisting steel tubing into such size and space that the inside coil may be inserted into the outer coils when assembling.

Figure 4:
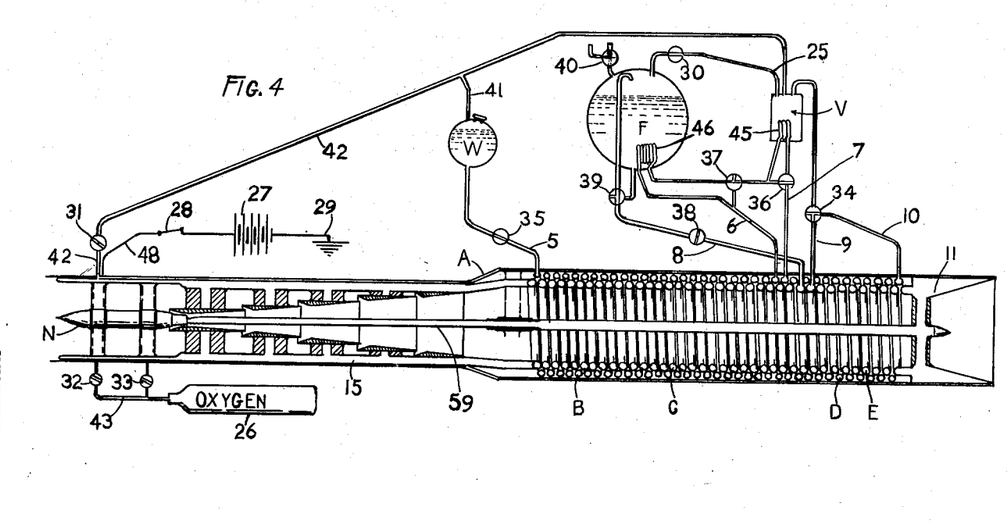
Figure 4 is a horizontal section of a jet propulsion unit with a schematic diagram of a fuel feed and ignition system.

Figure 4 illustrates a system of piping and ignition means arranged for a power plant of this invention, wherein liquid propane is used as a main fuel. In this application the vapor pressure of the propane is used to apply static pressure to the operating mediums as required thereby, making the unit self-starting and eliminating the need for pumping facilities. It is evident that some modification in the relative size and arrangement of the principal elements would be required to accommodate different types or mixtures of main fuel, primary fuel and pilot fuel. Also, most any conventional system of fuel storage, piping, pumping and flow-control means can be used with this engine.

For the sake of simplicity it is assumed in the following description that the main fuel is commercial propane with a vapor pressure of 225 p. s. i at 110° F. The primary fuel is methanol, mixed with water in proportion of 1 part methanol to 2 parts water and the pilot fuel is the propane gas. In Figure 4 the principal elements of a power plant embodying features of this invention are shown somewhat sectionally as they would be disposed in a shell or body A for installation, as a jet propulsion unit in an aircraft. Liquid propane as the main fuel supply is carried in pressure tank F. A simple means of automatically controlling the temperature, and consequently the pressure in this tank consists of a submerged heating coil 43 into which steam from coil section B is supplied through pipe 6, and automatic control valve 37, which valve is responsive to vapor pressure within the tank. To prevent this pressure from raising too high a vapor outlet line and a liquid outlet line are provided. Ordinarily the fuel would be taken out in liquid form, but if the pressure became too high in the tank, automatic control valve 39, which is also sensitive to vapor pressure, would open the vapor suction line and close off the liquid suction. This action would lower the temperature and pressure because of the low boiling temperature of the liquid propane. A safety pressure relief valve 40 is shown on the tank.

The primary fuel, consisting of water and alcohol, is carried in pressure tank W. This tank is under static pressure of the vapor from the main fuel tank F through a starting shut-off valve 30, and pipe line 41. Primary fuel is fed from tank W to the steam-generating coil section B, through pipe 5 and shut-off valve 35.

To insure that the propane gas is thoroughly vaporized before passing to the primary fuel tank or the primary burner, a vaporizing tank V is desirable. Gaseous fuel from the vapor space of the main fuel tank F is fed through pipe 25, and valve 30 into vaporizing tank V where a heating coil 45 is supplied with steam heat from steam generating coil section B through pipe 6, and controlled by automatic bypass valve 36. Pipe 7 returns this steam to the steam reheating coil section D. Pipe 10 conducts superheated steam from coil section D to automatic control valve 34. When starting from a cold condition, valve 34 passes propane gas from vaporizing tank V through the system to the primary nozzle N for warming up. When the engine is sufficiently hot, valve 34 closes off the propane gas and opens the primary fuel to the primary combustion process, described later. Pipe line 42 and pressure-regulating valve 31 conduct propane vapor from the vaporizing tank V to the pilot burner.

Figure 27:
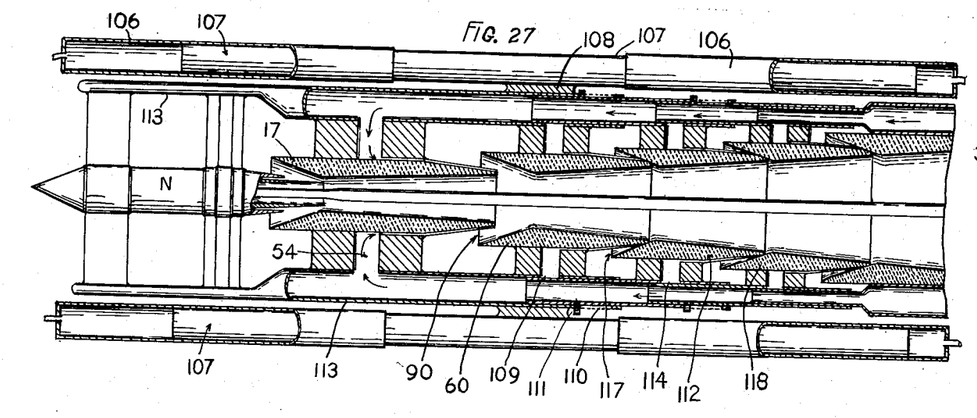
Figure 27 is a diagrammatic view in horizontal section of the inlet nozzle and air injection means, including the mechanism by which a number of the nozzles are closed and held in the closed position.
Figure 28:
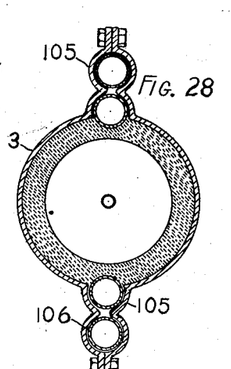
Figure 28 is a transverse sectional view taken at line 28—28 on Figure 27.
Figure 29:
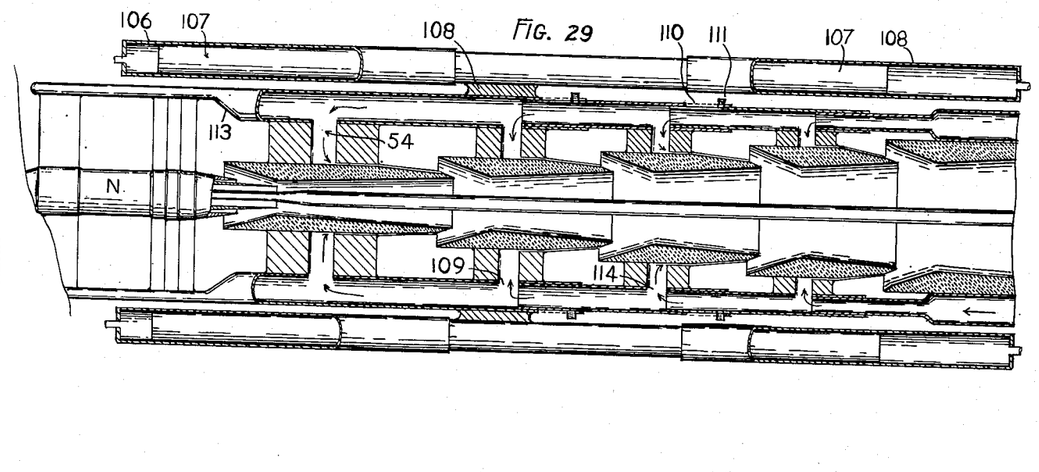
Figure 29 is a diagrammatic view in horizontal section of the inlet nozzle and air injection means, including the mechanism by which a number of the nozzles are opened and held in the open position.

To maintain a stable combustion in the pilot flame burner, pure oxygen is used an an oxidizer with propane gas as a fuel. In Figure 4, oxygen from tank 26 and pipe line 43 is admitted through pressure-regulating valve 32 to pilot burner N. Through valve 33, a small quantity of oxygen from line 43 may be admitted to the air entrance section of the first nozzle for purposes, and at times which will be described later. A simple ignition system is shown, consisting of a battery 27, ground wire 29, switch 28, and ignition wire 48; coils, condensers, automatic operating devices, etc., are not shown. Throttling and power out- put of the engine is controlled by means of a valve 38 in the main fuel supply line 8. A means of additional power out-put control, which is also applicable to this fuel system, will be described in a later paragraph and is illustrated in Figures 27, 28 and 29.

Figure 3:
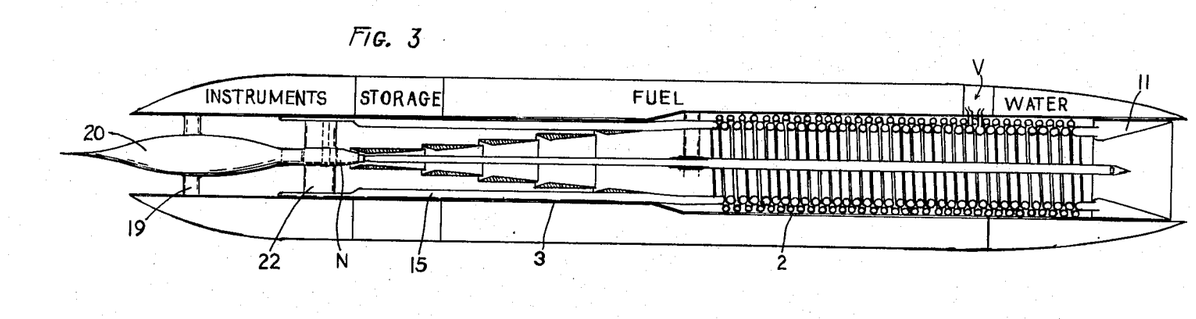
Figure 3 is a horizontal section of a jet propulsion unit housed in a supersonic missile and showing diagrammatically a suitable tankage arrangement, together with a needle-nose island member which forms an inlet diffuser section.
Figure 25:
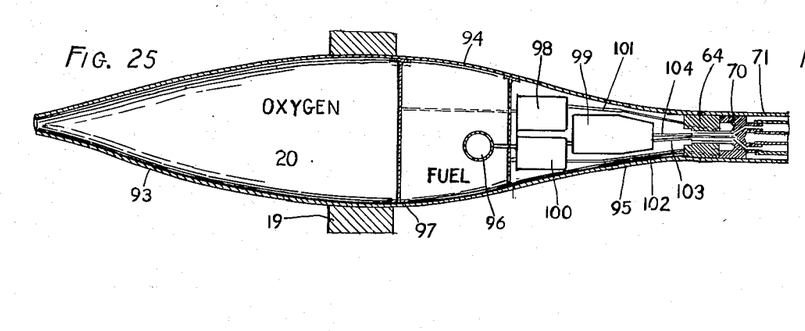
Figure 25 is a longitudinal sectional diagram of a needle-nose island member used to form the inlet diffuser section and containing the fuel, oxygen, ignition and control mechanism for the pilot flame burner.

Figure 3 illustrates diagrammatically a tankage arrangement for an air-borne vehicle of supersonic design, wherein some features of this invention are compounded with a supersonic air inlet and diffuser section commonly used in ram jet engines. In this application, the fuel types and the piping connections could be substantially the same as illustrated in Figure 4, excepting that the pilot burner fuel, oxygen, and ignition means would be contained in a cylindrical island member 20, as illustrated in Figure 25. This island member 20 is centrally and axially positioned in the ram inlet passage, and its frontal portion comprises a sharp pointed tip extending forward of the ram air inlet section of the shell, a distance depending on the angle of the shock waves encountered at the designed speed. The curved surface of the forward needle portion is such as will reflect the most efficient convergence of the resulting shock waves at the air inlet. The contour of the downstream portion of member 20 converges rearwardly, and is streamlined to blend into the exterior surfaces of primary nozzle N, which in this case, is held centrally by two vanes 22, welded to the forward ends of manifold type fuel supply pipes 15. The main body portion of member 20 is supported by four radially spaced vanes 19, which have their outer ends slidably fitted into longitudinal tracts or grooves, not shown, so as to hold member 20 centrally and guide its axial movement.

In supersonic ram jet performance the effect of compression due to shock waves is an important consideration. As the speed of an engine in the supersonic range is increased, the angles of the resulting shock waves, with relation to the longitudinal axis, are decreased. To obtain the most efficient ram compression ratio, the shock wave convergence must be maintained within the adjacent forward lip of the ram inlet. A means of compensating for this change in angularity, resulting from speed changes, is provided for in this engine as follows: an increase in flight speed increases the combustion chamber pressure and temperature, which in turn causes a rise in the pressure and temperature of the main fuel gas flowing to the nozzles through manifold pipes 15. The resulting increase in thermal expansion of the mainfold pipes 15 moves the needle nose member 20 forwardly, maintaining the shock waves in the ram inlet lip. In this manner speed changes, due to angle of flight, fuel consumption, air density, etc., may be compensated for effectively in the design.

The fuel and oxygen supply and ignition means for the pilot flame burner are contained and arranged in island member 20, as shown in Figure 25. The forward one-half of this member 20 is partitioned off to form a pressure storage space 93 for oxygen. An intermediate space is formed for a fuel storage tank 94, while the rearward portion 95 is under atmospheric pressure and contains the ignition system and regulating devices. A space 98 is provided for oxygen pressure regulating and flow control means. A battery-type ignition control means is provided for in space 99, and space 100 contains pilot fuel temperature control and flow metering means. Pipe 101 delivers oxygen from regulator to pilot burner. A battery-powered electric heating coil 96 is submerged in fuel tank 94 and thermostatically controlled to maintain the temperature and pressure in the fuel tank. Pipe 102 conducts fuel from flow meter to pilot burner. Duct 103 is for the passage of an ignition wire to a spark gap, hot wire or glow plug in the pilot combustion space, and 104 in a similar duct for a thermostat lead to actuate ignition source, if relighting is necessary. The controlling instruments enumerated and contained in this member 20 are conventional devices of various types and do not constitute a part of this invention.

Figure 5:
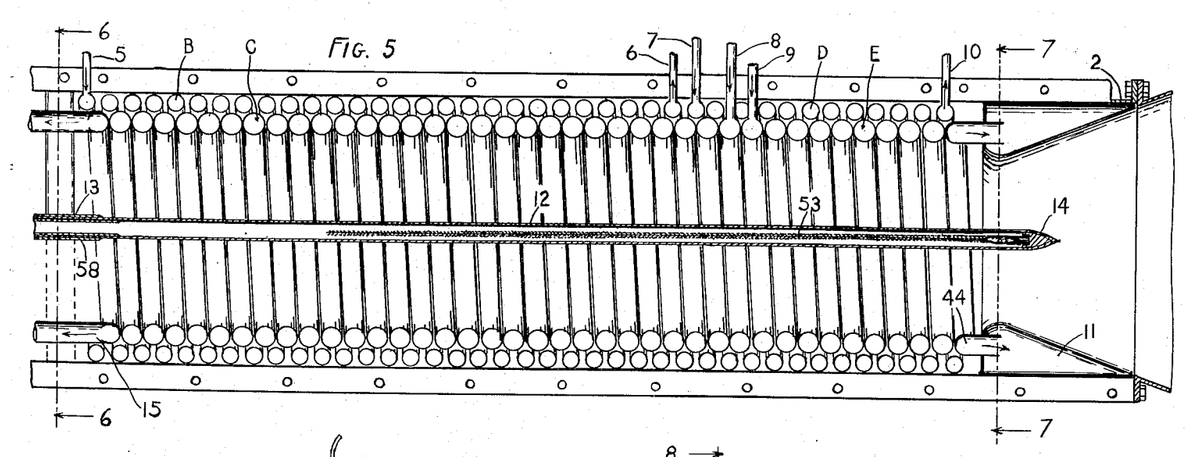
Figure 5 is an enlarged horizontal section of the combustion chamber and coil section.
Figure 6:
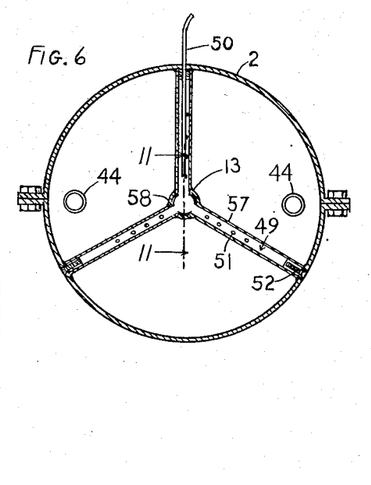
Figure 6 is a transverse detailed sectional view of the primary fuel temperature control means at the entrance to the combustion chamber, as indicated by line 6—6 in Figure 5.
Figure 7:
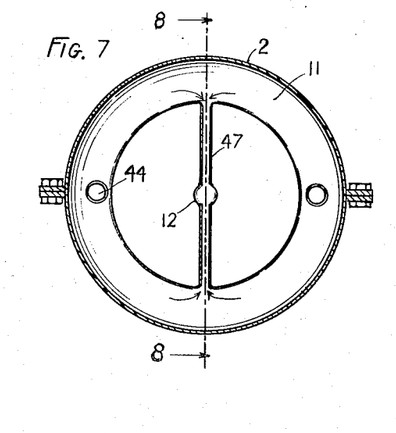
Figure 7 is a transverse detailed sectional view of combustion chamber exit nozzle taken as indicated by line 7—7 in Figure 5.
Figure 8:
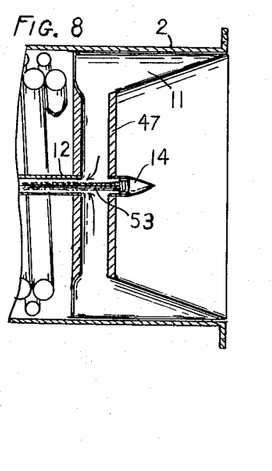
Figure 8 is a vertical detailed sectional view through the exit nozzle taken as indicated by lines 8—8 on Figure 7.

The unique features of the combustion chamber space are defined more in detail in Figures 5, 6, 7 and 8. This combustion chamber space is relatively long for its diameter and has very little constriction in the exit nozzle. The physical conditions under which the combustion takes place in this engine are similar to those encountered in ram jet engines, excepting that in the process embodied in this invention it is not necessary to materially slow the air stream, or to create a high degree of turbulence in the reaction zone. In the unique heat transfer means embodied in this invention, the combustion reaction proceeds under chemical and physical conditions favoring explosive velocities, but the so-called rough burning usually associated with these conditions is not encountered to an objectionable degree. As shown in Figure 5, the outer layer of coils is formed concentrically around the combustion space and is divided into sections B and D, the division being made by a separation or a constriction between pipes 6 and 7. This division is made for the purpose of diverting a supply of steam for heating the fuel tank; otherwise, the coil would run continuous the length of the combustion chamber. The primary function of these coil sections is to convert the water and alcohol mixture into a superheated steam vapor, but the coil also acts to shield the body shell from the high heat of the inner coil and the combustion chamber. The inner coil is formed of heat-resisting alloy tubing of larger diameter, and is also free to expand, and is divided at a location between main fuel inlet pipe 8, and primary fuel inlet pipe 9. The forward section C of said inner coil receives main fuel through pipe 8 from the main fuel supply, and discharges this fuel vaporized and heated to high temperature into the main fuel manifold pipes 15, which lead to the main air injection nozzles. Main fuel gas or primary fuel vapor is received in the rearward section E of the inner coil through inlet pipe 9. Two nipples 44, welded to the downstream ring segment of this coil, conduct the heated gases into an annular chamber, the inner contour of which forms an exit nozzle throat member 11. From this throat member 11 the fuel gases pass on through two ducts formed in diametrically disposed vanes 47, into a central tubular passage 12, leading forwardly and referred to herein as a retort tube. This retort tube is in effect a straight section of the primary fuel feed line that has its diameter slightly enlarged to receive a catalytic member 53. A faired nut 14 is made to hold member 53 in place, and to close the downstream end of tube 12. The reason for this high temperature environment in retort tube 12 is to induce a gas reformation process in which hydrogen and oxygen are dissociated in the presence of carbon, cracked from the methanol. The member 53 used in this case, is a long pencil-shaped stick of very porous carbon which, of course, will be slowly oxidized. It is, therefore, in this case, more a fixative than a catalyst. With some other fuel mixtures the catalytic member 53 would be formed as an elongated twisted wire brush, with bristles made of platinum or other suitable metallic catalyst.

Retort tube 12 is formed of high heat-resisting alloy metal, and is made compartively large in cross-sectional area to effect a relatively slow movement of the primary fuel mixture through its reaction zone. This is to allow sufficient time for the heat-absorbing reformation process to take place. In the presence of an effective catalyst and in the allotted time, an efficient water-gas reaction of the necessary quantity requires a temperature of approximately 1800° F. This is only slightly below the maximum temperature at which heat-resisting alloys currently available, can be so worked; therefore, some method of automatically controlling this temperature within the prescribed limits must be provided.

Figures 9, 10, 11, 12, 13, 14:
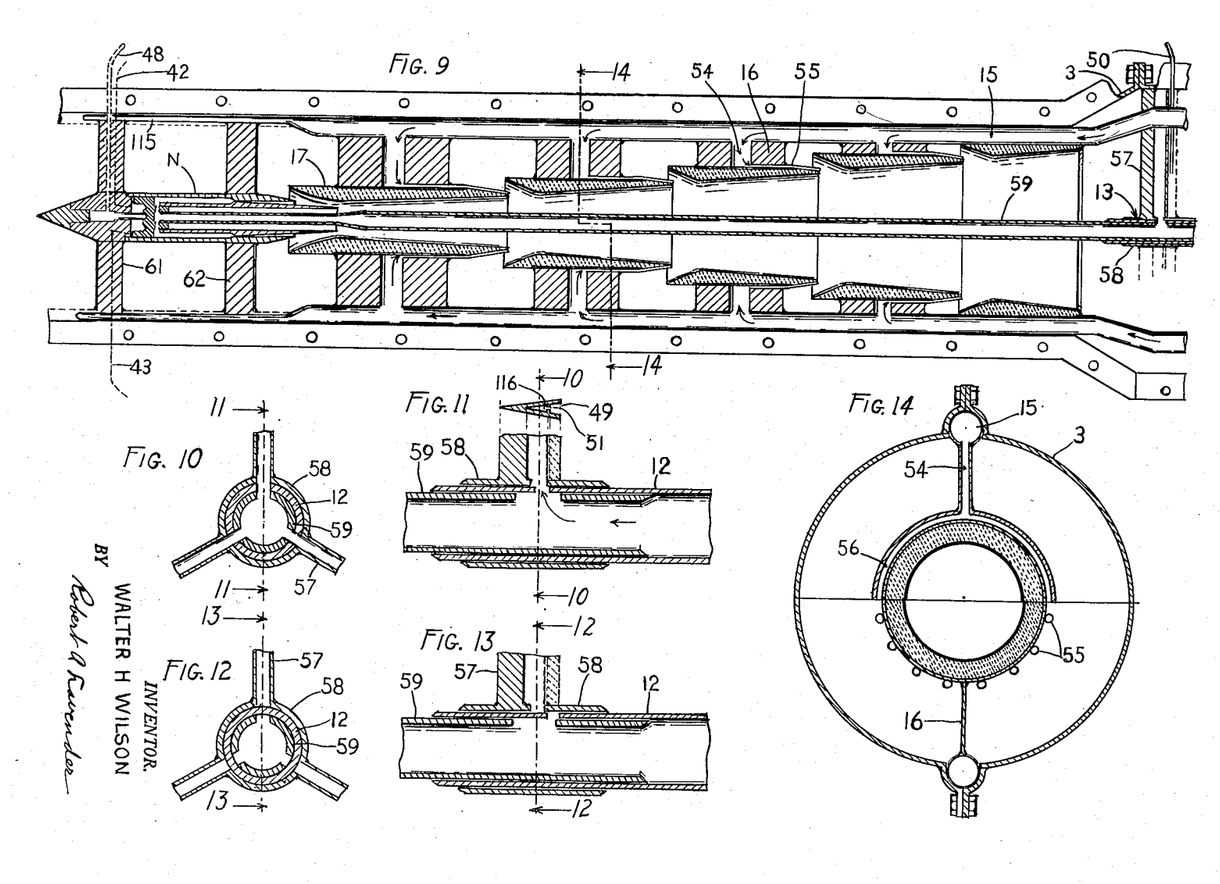
Figure 9 is an enlarged horizontal section of the inlet nozzles and air injection means.
Figure 10 is a transverse detailed section of the primary fuel temperature control means, with the bypass ports in the open position as indicated by line 10—10 on Figure 11.
Figure 11 is an enlarged detailed horizontal section of the primary fuel temperature control means taken as indicated by lines 11—11 on Figures 6 and 10.
Figure 12 is a transverse detailed section of the primary fuel temperature control means with the bypass ports in the closed position as indicated by lines 12—12 on Figure 13.
Figure 13 is an enlarged detailed horizontal section of the primary fuel temperature control means taken as indicated by lines 13—13 on Figure 12 and lines 11—11 on Figure 6.
Figure 14 is a transverse detailed section of a main injection nozzle taken as indicated by line 14—14 on Figure 9.
Figures 15, 16, 17, 18:
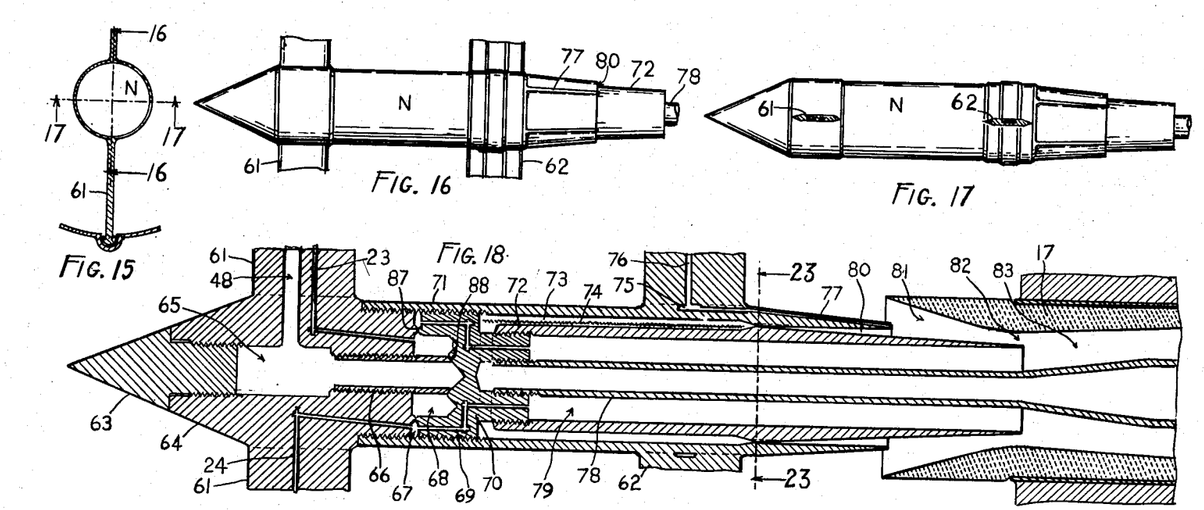
Figure 15 is a fragmentary cross-sectional front view of the primary nozzle and pilot burner.
Figure 16 is a longitudinal diagrammatic view of the primary nozzle and pilot burner taken as indicated by lines 16—16 on Figure 15.
Figure 17 is a longitudinal diagrammatic view of the primary nozzle and pilot burner taken as indicated by line 17—17 on Figure 15.
Figure 18 is an enlarged detailed horizontal section of the combination primary nozzle and pilot burner.

Temperature control means 13 is provided herein to control the temperature of retort tube 12. Said means is best illustrated in Figures 6 to 13 inclusive and its operation may be described as follows: the rearward end of retort tube 12 is held rigid by vanes 47 in throat member 11, while the forward end is slidably supported in sleeve member 58. When retort tube 12 expands lengthwise, as a result of rising temperature, its forward end slides forwardly in sleeve 58, causing matching ports in the two members to open in the conventional manner. Some of the reformed fuel gas is then by-passed through these open ports into gas passes 116 formed in the supporting struts 57, and from whence it is discharged into the main combustion stream. The resulting increase rate of flow through retort tube 12 will lower the temperature of the primary fuel mixture accordingly. Some leakage at this point is not objectionable, because of its beneficial effect on the main combustion reaction due to the availability of chain carriers in this reformed primary gas. Temperature control means 13 is made to serve also as a flame and ignition stabilizing means for the main combustion process when the engine is in full operation, and the method is as follows: sleeve 58 is supported by three spaced struts 57, extending radially outward and secured to the shell housing 2 by screws 52. Said struts are A-shaped in cross section as shown in Figure 11, with the inside partitions defining a duct 116 therein, and the extended downstream portion forming a gutter 49. A number of small holes 51 are drilled in these partitions to permit passage of the gas into the gutter spaces. One or more needle-like stainless steel tubes 50 may be inserted into and along the gutter for the purpose of admitting a small amount of oxygen or catalyzer when desirable. Immediately downstream of the struts 57 a turbulent zone is created in the main gas stream which is used for anchoring the flame front, and into which there is a radial diffusion of chain carriers from the injected primary fuel gas. That a small amount of leakage of the primary gas in this area is not objectionable will be readily understood; however, it is not the intention to bypass any considerable amount of primary gas at this point as one of the original constituents of this gas is water, which has no heating value and must be carried as cargo or recovered from exhaust gases. Primary fuel line 59 extends forwardly from within retort tube 12 and is located centrally in a high-heat zone to heat the primary gas during the warming-up period and at other times to retain the reformed primary fuel gas in stable equilibrium while conducting it to the hot primary nozzle N. This fuel line 59 is of tubing smaller in diameter and is slidably supported in the forward end of retort tube 12. Said tube 59 being subject to high heat, and extensive thermal expansion, has elongated ports cut in matching positions with those in tube 12, so that lateral movement will not obstruct flow through ports in tube 12 and sleeve 58.

Figures 19, 20, 21, 22, 23:
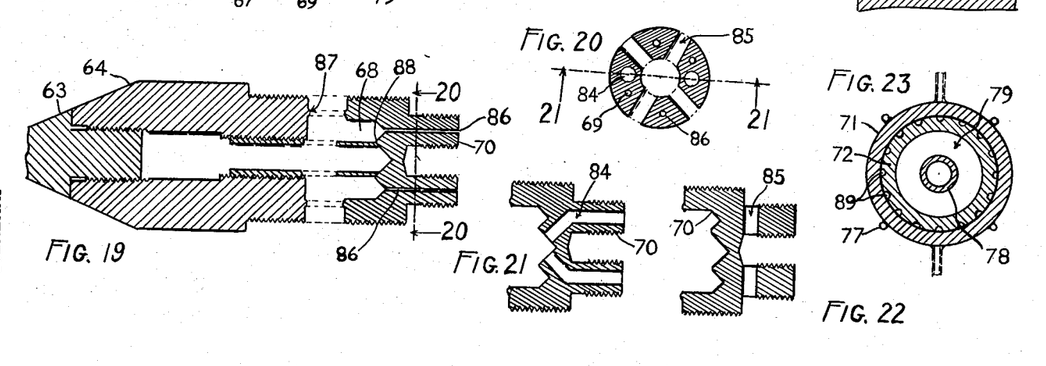
Figure 19 is an enlarged detailed longitudinal section of the pilot burner body member and pilot burner plug.
Figure 20 is a vertical section of the pilot burner plug taken at line 20—20 on Figure 19.
Figure 21 is a longitudinal section of the pilot burner plug taken through the ignition-means passage, as indicated by lines 21—21 on Figure 20.
Figure 22 is a longitudinal section of the pilot burner plug taken through the primary fuel passage.
Figure 23 is a transverse detailed section of the primary nozzle taken as indicated by lines 23—23 on Figure 18.

The primary combustion process is so-called herein, because it furnishes the means by which the necessary air and heat are supplied to initiate air injection and combustion in the main or thrust-producing combustion process. This primary combustion and the initial air injection means are best illustrated in Figures 15 to 23 inclusive. A simple form of the combination pilot burner and primary nozzle N, embodying some features of this invention, is shown herein to be generally cylindrical and streamlined, thus offering a minimum of resistance to the air stream which flows rearwardly through the intake section of the body shell A to the air injection nozzles G. Nozzle N is held by diametrically disposed vanes 61 and 62 which are welded or otherwise secured to the forward end of the main fuel manifold pipes 15. The primary nozzle means consists mainly of three tubular members, each of which is threaded to a plug member 70. The innermost tubular member 78 is merely a continuation to fuel line 59, but of reduced diameter. The intermediate tubular member 72 is larger in diameter and extends the length of the straight portion of member 78. Between these two members an annular space is formed, which constitutes the pilot-burner combustion chamber 79. The outer tubular member 71 is larger in diameter than member 72, and thus another annular space 73 is formed, extending from plug 70 to an intermediate position downstream, where both members have tapered shoulders, causing space 73 to converge sharply and close excepting for a plurality of peripherally-spaced slots 89. These slots form a nozzle throat in which the thermal expansion and creep of member 71 and 72 do not materially change the throat area. Member 72 is tapered decreasingly from this throat to its downstream end, forming a divergent primary nozzle 80. As shown in Figure 22, four radially-spaced holes 85 are drilled in plug 70 to provide communicating passages from primary fuel line 78 to annular space 73. Because of the sensitivity of the reformed primary fuel gas, and its tendency to react exothermically, it is helpful to insert a flame-arresting screen 74 consisting of one or more layers of wire gauze cylindrically formed to fit into space 73, which in the case of some fuel mixtures could also be made of an anticatalytic material. The downstream length of intermediate tubular member 72 extends into a tapered section of nozzle 17, and is concentrically positioned in such a manner as to form a convergent air entrance section 81. The end of member 72 approximately coincides with the longitudinal position of the smallest diameter in nozzle 17, and at this point the relative diameters define a throat 82, which limits the total entrance area available to the mass flow. The said mass flow consists of the primary jet of actuating fluid and the secondary stream of inducted air. It is of significance here to note that the heat released by the pilot flame in the pilot combustion space 79 maintains nozzle member 72 at a red-hot temperature. If unguided adiabatic expansion of the primary stream, after leaving the primary nozzle 80 is assumed, then it will be observed that the area available to the secondary stream of inducted air through the throat is comparatively small. The reason for this small secondary air flow is, that only a relatively small amount of oxygen is required to obtain a combustion reaction, due to the nature and composition of the primary fuel gas. Nozzle 17 thus functions as a primary combustion space. It is more important to sustain high pressure and high stream velocity through nozzle 17 so that with an explosive reaction in its divergent portion this nozzle becomes the primary nozzle for the following downstream main air injection and compression means. The hot combustion products flowing rearwardly from the exit of pilot burner combustion space 79 are made to initiate the explosive reaction in the nozzle as they are entrained by the primary mixed stream in the area or space 83 immediately downstream of throat 82. The convergent air entrance 81, throat 82 and space 83 constitute the primary fuel reversal or combustion space or chamber. During warming-up and idling conditions when the engine is stationary, relative to the atmosphere, the action of this pilot flame insures positive, stable and smooth combustion even in this explosive mixture stream.

A means by which pure oxygen or other oxydizer or catalyst may be injected into the inducted air stream at air entrance section 81 is provided, its principal elements consisting of a duct 76 formed in vane 62 communicating to an annular manifold space 75, and four tubular nozzles 77 disposed axially around and welded to member 71.

The unique features of, and particular functions performed by, what is referred to as the pilot burner embodied in this invention, are associated with, and form a part of the primary nozzle means just described. The parts comprising the features of this burner may be variously formed to accommodate a variety of conditions and requirements, as is evident in the two forms illustrated and described herein. Referring again to Figures 15 to 23 inclusive, body member 64 is cylindrical in shape with a tapered forward portion, and a chamber space 65 having a frontal access opening threaded to receive a pointed plug 63. The after-portion of the body 64 has an externally threaded section to fit securely into the threaded portion of tubular member 71. On the after-face of body member 64 there is machined a raised seat 87, having a true, smooth surface. Plug member 70 has a mating raised seat so positioned that when members 64 and 70 are screwed together into tubular member 71, a union is made separating annular spaces 67 and 68 by a gas-tight joint. Chamber 65 has a passage, opening rearwardly and threaded to receive threaded nipple 66. Said nipple extends through space 68 and seats tightly against a taper 88 in plug 70, thereby forming a third space. Assuming that for this burner, gaseous fuel and oxygen are the combustion reactants and ignition is by means of an electric spark, then an oxygen supply duct 24 is formed in one of the supporting vanes 61, said duct continuing as a drilled passage in body member 64, and communicating through a lateral passage into annular space 67. Two drilled passages 69 in plug 70 further conduct the oxygen from annular space 67 to combustion space 79. In the opposite supporting vane two ducts are formed, the smaller duct 23 supplies fuel gas in a similar manner through annular space 68 and passages 86 to the combustion space 79, while the larger duct 48 permits passage of an ignition wire to chamber 65 and through drilled passages 84 in plug 70, into the combustion space 79. In the case of an expendable missile, the battery ignition system could be replaced by an igniting powder charge contained in chamber 65.

Figure 24:
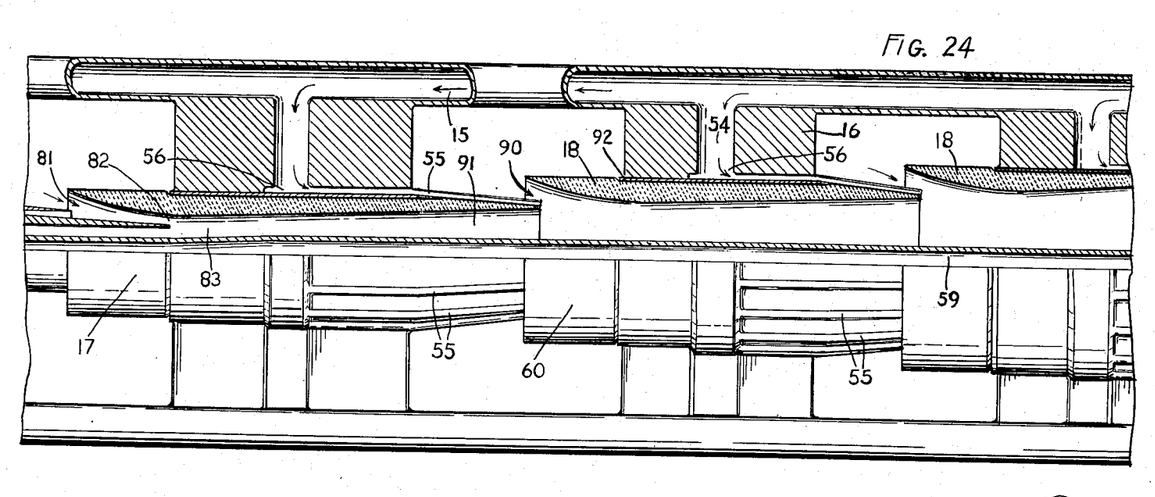
Figure 24 is a longitudinal view, partially in section, of a portion of the main fuel injection nozzles and the air compression means.
Figure 26:
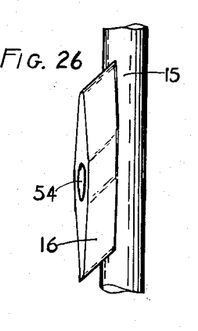
Figure 26 is a detailed view, in perspective, of a nozzle supporting vane, showing the fuel duct and manner of securing the vane to fuel manifold pipe.

The main fuel injection and air compression means, embodying some of the features of this invention, are best illustrated in Figures 9 and 24. Said means as illustrated herein are shown to comprise five air injection nozzles. The first nozzle upstream is referred to as the primary nozzle 17, its being actuated by the primary fuel mixture. The remaining four nozzles are called main air injection nozzles and are actuated partly by the main fuel gas. It is to be understood that the air compression means is not restricted to a precise number of nozzles, but may consist of a primary nozzle and one, or a plurality of main injection nozzles. Each of these nozzles consists mainly of a cylindrical ring or sleeve 92 made of heat-resisting alloy, and welded to two diametrically disposed supporting vanes 16. A renewable insert 18, cylindrically formed to fit securely into sleeve 92, is made of graphitic carbon alloy and has an internal profile which defines a convergent-divergent nozzle. The several nozzles are axially spaced, and being consecutively larger in diameter rearwardly they form a gradually enlarging combustion chamber inlet diffuser section. The most rearward downstream carbon insert is of sufficient external diameter to fit neatly the inside diameter of the shell housing 3. Fuel passages or ducts 54 are formed in vanes 16, said vanes being streamlined and welded to manifold pipes 15 in a manner as shown in Figure 26. Ducts 54 communicate with an annular manifold passage 56, formed externally of sleeve member 92. A series of circumferentially spaced fuel injection nozzle tubes 55 have their forward ends in communication with the manifold 56, and extend rearwardly in spaced adjacent relation to the converging external diameter of insert member 18. Said nozzle tubes 55 have their exits slightly enlarged to form small primary nozzles capable of directing a ring of high velocity jets of hot fuel gas into the entrance of the next downstream nozzle. In order that the several elements will retain the proper position relative to each other under varying conditions of pressure and thermal expansion, the nozzle-supporting vanes are welded to and held by two longitudinal fuel manifold pipes 15. Heat-resisting alloy is used in forming the manifold pipes, which are slidably contained in two longitudinal channels formed in the shell housing 3 as shown in Figure 14. Said manifold pipes have their rearward ends in communication with the foremost ring segment of coil C, and their forward ends have a closed semi-circular portion 115 extending forwardly a distance sufficient to receive and carry the supporting vanes of pilot burner nozzle N.

In some applications of this engine it will be economical to provide means for additional throttling during idling and low-power operation. Such additional means are provided herein and are best illustrated in Figures 27, 28 and 29. An engine consisting of four main nozzles is shown and a method of closing off either one, two or three of the main nozzles is illustrated. The nozzle members embodied herein are generally similar to those previously described with the exception that the nozzle exit profile is modified slightly, and in a manner that adjoining nozzles will join neatly together when in the closed position as illustrated in Figure 27. The nozzles are shown in the open position in Figure 29. The main fuel manifold pipes shown herein are made in sections of different diameters in such a manner that a section of smaller diameter fits slidably in telescoping fashion into the next larger section. Each section is of such length that the outlet fuel opening from the manifold pipe through the lateral duct passage 54 is closed by the leading edge of the smaller tube when the corresponding nozzle is in closed position. Any leakage of the fuel gas at these connections would be swept into the combustion chamber by the air stream before an inflammable mixture could be formed and ignited, so the overall operation would not be materially affected by small leakages. A means for opening and closing any number of the main nozzles is provided in a simple servomechanism, consisting principally of two hydraulically-operated pistons 107 responsive to a manual or automatic primary pressure control means. Said pistons 107 are adapted for relative reciprocation within elongated cylinders 106 which are held in longitudinal channels 105, formed in body shell housing 3, as shown in Figure 28. Pistons 107 are attached to the foremost tubular section 113 of the main fuel manifold pipe by lugs 108, welded to both members, said lugs 108 being free to move longitudinally in suitable spaces provided between the two channels formed in the shell housing 3. A disclosure of a servomechanism pressure control means for operating the pistons 107 is not essential to an understanding of this invention, and is, therefore, omitted. Pilot burner N, the primary nozzle 17, and the first main injection nozzle 60 are all held in spaced relation by being welded to the forward section 113 of the main fuel manifold pipe. When these members are moved forward by the action of pistons 107, the entrance section 117 of the second main nozzle 112 is opened, and the corresponding main fuel duct passage 109 is uncovered, thus admitting main fuel gas to flow through the nozzle as before mentioned. A further forward movement of section 113 causes the rearward end of slots 110 to engage set screws 111, and move nozzle 112 forwardly opening the entrance to the next nozzle 118 and its corresponding main fuel duct passage 114. In like manner any number of nozzles may be opened or closed by adjusting the pressure differential applied to pistons 107 in the forward and after hydraulic cylinders. It will be observed that the portion of the nozzle section which remains closed as a result of this throttling, forms effectively a conical diffuser-type inlet to the combustion chamber, which under idling and low power conditions is helpful in supporting the chamber pressure.

In any jet propulsion engine in which atmospheric air is used for the combustion reaction, the air compression means constitutes a major component. In this invention the efficiency of the thermocompressor means is intimately associated with the combustion process and for that reason a description of the engine should include a disclosure of the correlation of the two processes. A thermocompressor of conventional design, using gaseous fuel of high heating value as motivating fluid to compress air in sufficient quantity to support the combustion of the fuel, would not operate against a useful pressure rise. The multiple jet air injection means which forms a part of this invention, does accomplish this compression effectively, and the unique features of its cooperative action with the combustion process will become evident in the following disclosure. The entraining capacity of a vapor-jet air compressor depends principally on the surface offered by the jet or jets for contact with the air; the kinetic energy is more a function of the pressures and temperatures involved. The so-called main injection nozzles of this invention might well be called diffusers were it not for the dominating performance, as a motivating force, of the primary combustion gas stream flowing through these nozzles at extremely high velocities. This primary stream issues from the first nozzle at supersonic velocity, and in itself constitutes a series of primary jets as it flows rearwardly through the main nozzles; the jets of main fuel gas are arranged to forcibly inject air into this high velocity primary combustion stream. The jets of main fuel gas have high entraining capacity, but low kinetic energy, whereas the reverse is true of the primary combustion stream. Boundary layer effects, wall friction, and impact, all of which contribute to the inefficiency of an ordinary jet compressor, are practically eliminated in the thermocompressor of this invention.

To maintain stable combustion in these high velocity streams, this invention provides for the interaction of three combustion reactions and three fuel systems in which the generation and diffusion of chain carriers is so emphasized that chemical inflammability and ignition limits are practically eliminated. The use of catalytically-active high temperature materials in the primary reaction zone, the complete fluid shielding of the main combustion space, and the unique system of fuel circulation and heat transfer, permit the employment of the high temperatures required for maintaining these conditions. The pilot burner is made to furnish a continuous supply of chain carriers and ignition heat to the primary fuel stream, and in addition it maintains the walls of the primary nozzle at red heat. Most any gaseous or vaporized fuel can be used for this pilot flame, but because of the long length and restricted cross-sectional area of the pilot combustion chamber, the best results are obtained if the reacting elements are of such nature and proportions that the mixture is capable of detonation.

When associated with an aircraft or airborne missile to form a propulsion means therefor, the primary and main combustion processes proceed in four characteristic stages; first, a warming-up stage with cold flow; second, the engine idling; third, the engine stationary but developing static thrust; fourth, flight conditions where ram air pressure becomes a factor of major consideration. Assuming, for purposes of illustration, that the main fuel is liquid propane, the primary fuel is methanol and water, and the tankage and piping arrangement is, as illustrated in Figure 4, an evolution of the processes could be described as follows: at atmospheric temperature (70° F.), the propane would have a vapor pressure of approximately 120 p. s. i. With this vapor pressure available no preheating or pumping is necessary. The system is pressurized by opening shut-off valve 30, and the pilot burner is lighted by electric means previously described. Through valve 34 propane gas is admitted to the primary system for warming up, and this gas is made to inject air for its own combustion in the following manner. Vapor pressure forces this gas through the primary heating system, now cold, and causes it to expand in a high velocity jet from the primary nozzle 80. This expansion entails a sudden drop in temperature, and ordinarily the nozzle would frost up and ignition would be difficult, but in this engine the nozzle passages 78, 73 and 80 are heated to a high temperature, 1800° F., by the pilot burner flame. Thus heat is added to this fuel gas as it circulates through the hot nozzle passages, and is available to do work in the nozzle. The injector action of this gas jet causes some air to be drawn in through entrance section 81 into the nozzle 17, but this gas is a hydrocarbon fuel and requires considerable oxygen for its combustion; more than will be required by the primary fuel gas (water and methanol), which will flow through this jet after the engine is warmed up. It is well to note here that the area through the combustion chamber exit nozzle is about three times the total combined area of the entrance nozzles; therefore, when there is no burning in the combustion chamber proper there is no back pressure to oppose the free flow of inducted air. If, during this period of warming up, the mixed stream is enriched by the injection of pure oxygen through tubes 77, the resulting combustible mixture will be ignited by the pilot flame, and combustion reaction will initiate in the divergent portion of nozzle 17. However, if oxygen is not injected the fuel gas and air will expand through the nozzle 17, and this stream will act as a primary jet to draw more air in through the entrance 90 of the next main nozzle 60. This additional induced air supply is sufficient to form a combustible mixture and the combustion reaction will proceed from where these two streams are mixed. The heat released by this primary combustion raises the temperature of the gases flowing through the heating coils, and the acceleration of the primary gas stream due to this rising temperature results in more air being drawn in through the down-stream nozzles. As the temperature of this fuel gas increases, the number of B. t. u.'s flowing through the nozzle decreases, because of the decrease in density and choked flow at the nozzle throat. This favorable compensating action permits the addition of more fuel to consume the excess air, so the main fuel throttle valve 38 is opened slightly to admit a small amount of heated main fuel gas through the main fuel injection nozzle tubes 55. This fuel burns as it emerges from the nozzle tubes 55, and although the combustion of this comparatively small amount of main fuel will not cause a significant pressure rise across the combustion chamber, it does concentrate flame in the nozzle inserts 18, and if these inserts were made of metal and this flame were continued for a sufficient length of time, the metal inserts would be burned or warped. Observations of test runs made with a working model of this engine indicated that oxidation of the carbon inserts is very little in the short period of time the engine need be operated at this level. The heat released from this combustion is sufficient to boil the water and alcohol solution in the steam coil B, and when a predetermined superheat temperature of the resulting vapor is reached the thermostatic control valve 34 functions, closing off the flow of propane gas and opening the primary fuel vapor from coil section D into the primary system. With this functioning of valve 34 there will result a flow of hot vapor through the main fuel tank heating coil 46 to raise the fuel tank temperature and corresponding vapor pressure to the designed working pressure levels throughout the system (approximately 250 p. s. i.). Under these conditions the combustion chamber temperature will rise, but the heat transfer to the retort tube will still not be sufficient to complete a gas reformation in the combustion chamber section, but the endothermic process will continue in the fuel line 59, which is a continuation of the retort tube, and which passes through the center of the nozzle section in which the primary combustion is taking place. The reformed primary gas requires very little air for its oxidation and the injection of pure oxygen can be discontinued. With the system warmed-up and the combustion of main fuel furnishing the necessary added heat, the primary combustion stream is required only to actuate the primary jet and to ignite and catalyze the main combustion reaction. When the conditions just described reach adiabatic equilibrium throughout the system the engine is said to be idling. Since there is no reaction from burning in the combustion chamber to support a diffuser pressure, the only pressure at the inlet to the combustion chamber is that due to internal drag. Efforts to increase the specific impulse of the engine by using a primary fuel of higher heating value or by increasing the volume input of the primary fuel will yield only diminishing returns, because of a tendency to reversal of secondary flow in the nozzles. With properly designed nozzles, any increase of efficiency in the air compression and static thrust must result from improved internal kinetics i. e., higher temperature and higher velocities of the actuating streams. Because of choking and shock associated with supersonic velocities in the primary streams, these phenomena must be given due consideration in the nozzle design.

To increase power from idling through static thrust to underway flight conditions, the only control necessary is the regulation of the throttle valve 38. With the opening of this main fuel throttle valve, however, the thermodynamic processes and the physical conditions, which characterize the internal flow pattern, undergo radical changes. The addition of fuel raises the temperature of the main fuel gas and results in a decrease of density and a corresponding decrease B. t. u. input per unit volume. As the main fuel flow velocity is increased by further opening the throttle valve, the combustion flame moves progressively downstream and into the combustion chamber proper. This movement of the combustion reaction out of the nozzle section is a necessary condition for the efficient operation of the air compressor means during stationary thrust-producing operation. During these conditions the divergent passage formed through the downstream nozzles functions as a conical diffuser to support the combustion chamber inlet pressure. If the combustion reaction of main fuel continued to take place in the nozzle section, the effects of fluid friction, impact and turbulence would prevent satisfactory performance of the injection nozzles and the diffuser. With the establishment of combustion in the combustion chamber proper, the temperature of the main gas stream is thereby raised with the result that it expands, accelerating toward the rear of the combustion chamber at an ever-increasing velocity and decreasing pressure. The inlet injector nozzle and diffuser pressure is supported by the reaction to this acceleration of the combustion gases. With a two-fold increase of absolute static pressure, the combustion chamber exit nozzle attains sonic velocity and becomes choked. With the exit choked, the quantity of air to be compressed in the inlet nozzles depends upon the temperature rise between the inlet and the exit throat; the quantity being less, as the temperature rise increases. The temperature rise is highest when the fuel air ratio is such that adiabatic equilibrium is reached in the exhaust gases, or when a lower temperature is required by material limitations. It follows, then that maximum efficiency requires the highest exhaust temperature. This indicates only part of the economic benefits that are derived from the circulating of the fluid in heat exchange through the components in contact with the combustion chamber heat; other benefits will become evident in the following paragraphs.

This invention incorporates several unique features, which contribute to the maintaining of stable combustion in the combustion chamber during the thrust-producing operations. Typical stream velocities, in which this combustion must take place, range from 300 feet per second when the fuel-air ratio is ideal, to more than three times that amount when the fuel-air ratio is extremely lean or extremely rich. Stream velocities in this range do not, however, impose too difficult a problem in this engine, because the reaction is explosive in nature and is made to proceed at much higher velocities. It is well to observe here that explosive burning has been purposely avoided in previous jet engines, because of the disturbing and even destructive effects of what has been called rough burning. In the present invention, explosive reactions are deliberately encouraged, but are controlled in such a manner that smooth, safe and relatively quiet burning at high velocity is accomplished. The reaction in the primary process resembles somewhat the performance of liquid fuel rockets. In this invention, the fuel mixtures and mechanical components are so related and designed that the combined functioning of the pilot flame and the primary combustion process is capable of independent performance, during either static or flight conditions. That is, once the engine is warmed up the main combustion process may be turned on or off at will. During these stages of operation the primary combustion process concentrates heat directly on and around the fuel inlet pipe 59 and retort tube 12. Due to the methanol content, the amount of this heat is sufficient to maintain these surfaces at the high temperature (1800° F.) required for the reformation of a sufficient quantity of the gaseous primary solution, so that the regeneration process is self-sustaining without benefit of heat from the combustion of main fuel.

The method and means of maintaining and controlling the reactions of explosive velocities in the primary combustion process may be described in terms of the diffusion theory as follows. It is not yet fully understood, but a well-known and duly respected fact, that if an oxygen and hydrogen mixture is lowered in pressure a level will be reached where the reaction takes place with explosive speeds. The explanation is, that a number of chain-branching reactions occur preceding the final products, and that there is some pressure and temperature level where the chain reaction is favored or another chain-branching reaction is initiated. In the engine of this invention the reformed primary fuel mixture, containing substantial quantities of hydrogen and oxygen, expands through the divergent nozzle, and reaches the point of lowered pressure where the chain reaction occurs with explosive velocity. This gives rise to a pressure wave, which is reflected through the stream with a frequency, depending on the density of the gas and the physical conditions of the flowing stream. These high-frequency pressure waves or surges, reflecting into the approaching jet, effect a substantially fixed concentration of chain carriers available to continue the chain reaction. This reaction, however, is exothermic and cannot take place if the mixture temperature is critical, as is normally the case during steady flying conditions. When the main combustion process approaches a fuel concentration near stoichiometric, there is a decrease in air flow through the nozzles and less cooling effect. A resulting pressure rise across the nozzles and diffuser is accompanied by a decrease in the expansion and temperature drop of the primary stream, while the input of heat and products by the pilot flame remains constant. Further compression, slowing, and temperature rise occur throughout the diffuser section. These and other minor factors contribute to a rise in mixture temperature, and as it approaches the critical value the combustion reaction moves progressively downstream and into the combustion chamber. However, radial diffusion of chain carriers and radiant heat transfer continue to exert their catalyzing influence on the main combustion process as does the propinquity of the main fuel gas to the hot carbon nozzle inserts. With a general lowering of temperature from less favorable main fuel concentration, this primary combustion reaction moves back into the nozzle section. By controlling the temperature of the primary fuel mixture as previously described (means 13), and by establishing the optimum pressure drop in the flow through the nozzle passage, the explosive reaction of the primary process is effectively controlled in both speed and magnitude.

In the main combustion process this typical system uses a mixture of hydrocarbon fuel and air, and the combustion reaction control differs somewhat from the system employed in the primary combustion process just described. It is a well known fact that the combustion of hydrocarbon fuels occurs in a number of complex steps resulting in the formation of intermediate products, and proceeding at widely varying rates. The various steps respond differently to the chemical and physical conditions of the reactions, which makes it possible to substantially control these reactions by altering the physical mechanisms. In the combustion process there is a period of pressure and temperature rise where some substance capable of propagating chains is produced. It is generally believed that the formation of an aldehyde during the temperature rise is the catalyst that induces the reaction, which causes a rapid formation of the chain carriers necessary for an explosive reaction. If a high degree of turbulence is created in a mixture stream, the flame propagation may proceed normally and a relatively fixed flame front can be established with the flame anchored to a stabilizing device at the ignition source. This is the common practice, but this turbulence is acquired only at the expense of increased internal drag and less favorable reaction kinetics resulting in lowered efficiency, i. e., where the efficiency of the engine thrust producing means is the major objective, and the combustion efficiency refers only to the efficacy of the chemical conversion process. On the other hand, if the degree of turbulence is lessened and the stagnation temperature is raised, it becomes increasingly probable that a substantial mass of unburned mixture will reach ignition temperature before the advancing flame front, in which case a detonation or explosion of the involved mixture will occur. The uncontrolled recurrence of such pressure surges and accompanying flash backs is called rough burning. These explosive reactions will stop only where the chemical and physical conditions are such as to interrupt the regeneration of the chain carriers. This factor is of considerable significance, as it indicates the mechanism by which the magnitude of the pressure surges are effectively controlled in this engine. Of prime importance in this connection is the fact that two gases cannot react at a rate greater than that at which they are mixed, the controlling factor being the rate of diffusion, and in the design of this engine the entraining capacity of the main fuel jets. This limiting feature of the combustion process is the major cause of the beforementioned shifting of the combustion reaction from the nozzle section into the combustion chamber. It is also this factor that is employed in this engine to confine the volume of unburned mixture, capable of detonation, to a relatively small quantity in the immediate vicinity of the flame stabilizing vanes 51. These gutter-type vanes 51 create a turbulent zone across the combustion chamber beyond which an initial point of the exothermic reaction of the primary process will not pass. Conjointly, a relatively quiescent region is provided in the wake of the gutters for the radial outflow of chain carriers into the main fuel stream. Thereby, the flames of both combustion processes are united and firmly anchored to the bluff trailing edges of the vanes. If detonations occur, they are barely noticeable, and flashbacks into the diffuser cannot occur for reasons mentioned above, and also because the temperature of the primary stream is much higher than ignition temperature. If the conditions of the main stream were such that a reaction could take place, then the high temperature primary stream would ignite at the interface between the two streams, and a flame front would be established. As long as the pilot flame burns and the endothermic water-gas reaction of the primary fuel mixture continues there will result a condition of forced oxidation of whatever fuel mixture is flowing, which is capable of reacting in the stringent time limitation imposed by the linear stream velocity.

Transition from stationary thrust operation to underway or flying conditions, involves very little change in the combustion process of this engine. Changes in the method of controlling the combustion reaction processes will depend more on the application of the engine and the thermochemical properties of the fuel used. In a piloted aircraft where maximum power is required for the take-off, an injection of additional oxygen into the primary nozzle will increase the air compression ratio and static thrust. The continued injection of oxygen during flight would be unprofitable and unnecessary. In high speed expendable missiles the range can be increased by using water in the primary fuel sufficient only to acquire supersonic speed, then shifting to kerosene or other high heat fuel as ram air pressure becomes sufficiently developed. In designing for supersonic translational velocities, the shock conditions at the air inlet and diffuser sections will be of major importance when the relative proportions of the engine components and the nozzle geometry is considered. Maneuvering acceleration, humidity, temperature and altitude changes have only minor affects on the combustion process. Once the exhaust from the combustion chamber is choked, these changes can only vary the temperature and pressure levels through the system, as the exhaust velocity cannot rise above that fixed by the velocity of sound. Maximum thrust requires the maximum exhaust temperature, which is a result of fuel-air ratio, and is automatically controlled thermostatically. Maximum efficiency at any speed or throttle setting, requires the retention of sonic velocity at the exit, and chemical equilibrium in the products, i. e., complete combustion prior to exit.

This power plant is ideally suited for helicopter operation, with the engines installed in the tips of the rotating wings. In this application, however, the main fuel must be throttled and vaporized before being fed into the wings; otherwise, the centrifugal pumping action of the rotating fuel lines would cause excessive pressure rises in the system and effective throttling would be difficult. The physical and thermochemical properties of propane make it an ideal fuel for this application. Because of the early development of ram pressure in this rotating wing tip installation, the high-velocity primary reaction is needed for air injection only when warming up and starting. By using an explosive mixture of propane gas and oxygen for starting as previously described, the water and steam coils may be eliminated and the retort tube decreased in size. The main fuel and air injection means employed in this engine minimize the disturbing effects of cyclical oscillations due to translational speed.

There is thus provided an engine with three separate fuel systems in which systems three separate combustion reactions take place, each of the reactions cooperating with the others and all contributing energy to the power delivered by the engine. The systems are: a "main" fuel combustion system consisting of a main fuel supply, means for vaporizing and superheating the main fuel, a main injector for entraining and forcing fuel gas and air into a main combustion chamber, some of the energy to "actuate" the injector, that is, energize the injector or effect entrainment, being supplied by expanding jets of vaporized hot main fuel, and an exit jet propulsion nozzle leading from the main combustion chamber; a "primary" fuel combustion system to furnish most of the energy to actuate the main injector and to produce chain carriers consisting of a primary fuel supply, means for vaporizing the primary fuel into a gas and for endothermically reforming the gas into a highly explosive mixture of elements, a primary jet impelling nozzle, means for reversing, that is, means providing for an exothermic combustion reaction of the reformed primary gas in a primary fuel combustion space within the primary nozzle, which nozzle discharges the products of the primary combustion at high velocities into the throats of the main nozzles of the main air injector; a "pilot-burner" fuel combustion system for supplying heat to the primary fuel system to initiate combustion and maintain certain parts of the primary system at the desired temperatures and for supplying chain carriers to the main combustion reaction consisting of a fuel supply, an oxygen supply, a combustion space juxtaposed parts of the primary system and means to initiate combustion; the products of the pilot-burner combustion being mixed with the products of the primary combustion as both products flow toward and into the main air injector and thence into the main combustion chamber.

While there is shown and described herein certain structure illustrating only a typical form of the invention, it is to be understood that the invention is not limited thereto or thereby, but may assume numerous other forms and includes all modifications, variations, and equivalents coming within the scope of the following claims.

I claim:

1. A propulsion means comprising a tubular shell and coaxially disposed therein a nozzle and an elongated pilot burner, the rearward end of said pilot burner being disposed towards the forward end of said nozzle, said pilot burner having three concentrically arranged annular chambers, means for delivering a primary fuel to the innermost of said chambers and passing it to the outermost one thereof, means for delivering fuel to the intermediate one of said chambers and igniting said fuel, an annular member partially surrounding said nozzle and spaced therefrom to provide an annular passage therebetween, and means for delivering a main fuel to said passage.

2. A propulsion means comprising a tubular shell and coaxially disposed therein a nozzle and an elongated pilot burner, the rearward end of said pilot burner being disposed within the forward end of said nozzle, said pilot burner having three concentrically arranged annular chambers, means for delivering a primary fuel to the innermost of said chambers and passing it to the outermost one thereof, means for delivering fuel to the intermediate one of said chambers and igniting said fuel, an annular member partially surrounding said nozzle and spaced therefrom to provide an annular passage therebetween, and means for delivering a main fuel to said passage.

3. A propulsion means comprising a tubular shell and coaxially disposed therein a nozzle and an elongated pilot burner, the rearward end of said pilot burner being disposed towards the forward end of said nozzle, said pilot burner having three concentrically arranged annular chambers, means for delivering a primary fuel to the innermost of said chambers and passing it to the outermost one thereof, means for delivering fuel to the intermediate one of said chambers and igniting said fuel, an annular member partially surrounding said nozzle and spaced therefrom to provide an annular passage therebetween, means for delivering a main fuel to said passage, and said main fuel delivering means comprising a coiled tube disposed within said shell coaxially therewith and rearwardly of said nozzle.

4. A propulsion means comprising a tubular shell and coaxially disposed therein a nozzle and an elongated pilot burner, the rearward end of said pilot burner being disposed towards the forward end of said nozzle, said pilot burner having three concentrically arranged annular chambers, means for delivering a primary fuel to the innermost of said chambers and passing it to the outermost one thereof, means for delivering fuel to the intermediate one of said chambers and igniting said fuel, an annular member partially surrounding said nozzle and spaced therefrom to provide an annular passage therebetween, means for delivering a main fuel to said passage, said main fuel delivering means comprising a coiled tube disposed within said shell coaxially therewith and rearwardly of said nozzle, and said primary fuel delivering means comprising a tubular member extending forwardly through said coiled tube and said nozzle into communication with said innermost chamber of said pilot burner.

5. A propulsion means comprising a tubular shell and coaxially disposed therein a series of nozzles and an elongated pilot burner, the forward end of each of said nozzles being disposed towards the rearward end of the more forward nozzle in said series, the rearward end of said pilot burner being disposed towards the forward end of the forward nozzle in said series, said pilot burner having three concentrically arranged annular chambers, means for delivering a primary fuel to the innermost of said chambers and passing it to the outermost one thereof, means for delivering fuel to the intermediate one of said chambers and for igniting said fuel, an annular member partially surrounding each of said nozzles and being spaced therefrom to provide an annular passage, and means for delivering a main fuel to each of the passages so provided.

6. In a jet propulsion engine, a tubular shell, a thermocompressor air injection means in the forward section of the shell comprising a primary nozzle capable of spouting a high velocity jet of expanding primary fuel gas mixture through a divergent diffuser arrangement of a plurality of main air injection nozzles, the jet from said primary nozzle working in cooperation with a plurality of jets of main fuel gas to inject and compress air into a combustion chamber located in the rearward portion of the shell, tubular coils enclosing the combustion space in which coils the primary and main fuels are vaporized before being discharged as jets into the thermocompressor, a primary fuel feed pipe passing through the combustion chamber to deliver the primary fuel vapor to the primary nozzle at high temperature, and means providing for thermal expansion and contraction of the fuel feed pipe.

7. In a jet propulsion engine, a tubular shell, a thermocompressor air injection means in the forward section of the shell and a combustion chamber in its rearward section, heating coils positioned within said chamber, a tubular conduit passing through the combustion chamber for conducting fuel gas from the heating coils in the combustion chamber to a primary fuel injection nozzle in the forward section of the air injection means, a portion of said tubular conduit passing through the reaction zone of the combustion chamber being enlarged and arranged to form a retort tube section in which the flow of the fuel gas is slowed and the gas is heated to a temperature sufficiently high to effect a partial reformation of the constituents of the gas, means providing a catalytic material receivable in said retort tube to catalyze the reformation process, and means of slidably supporting the retort tube and conduit within the combustion chamber in a manner that permits both members to move freely in thermal expansion.

8. In a jet propulsion engine, a tubular shell, a combustion chamber in the rearward section of the shell, a series of tubular coils enclosing the combustion space and through which the fuels pass and are vaporized, a primary fuel feed pipe passing through the combustion space and conducting fuel gas to the primary fuel injection nozzle, in the forward section of the shell a thermocompressor air injection means comprising a primary nozzle and one or more main nozzles which are supported and held in spaced relation by ducted vanes or struts secured to fuel manifold feed pipes which conduct the fuel vapor from the tubular coils in the combustion chamber to the ducted vanes or struts, and means for slidably supporting said fuel manifold pipes that permit free movement in thermal expansion.

9. In a jet propulsion engine, a tubular shell, a thermocompressor air injection means in the forward section of the shell comprising a primary nozzle and a plurality of main air injection nozzles, the energy for effecting injection being supplied partly by jets of vaporized main fuel, said main injection nozzles being arranged in axial alignment with one another and being slidable with respect to one another, hydraulically pressure operated pistons, means connecting said pistons, respectively, to each of said main air injection nozzles whereby the main air injection nozzles may be moved relatively to each other to cut off or open the fuel vapor flowing therethrough.

10. A jet propulsion engine comprising: a tubular shell having primary, main and pilot fuel inlets and a multiple jet thermocompressor air injection means in its forward section to discharge fuel gas and air into a main combustion chamber in its rearward section; a pilot-burner and means to maintain combustion therein; means providing a primary fuel combustion space, the said space being intermediate the pilot-burner and the main combustion chamber, means providing a primary combustion reaction in said space to forcibly oxidize the combustion reaction in the main combustion chamber, thereby increasing the range of fuel-air ratios over which the combustion reaction will be stable; means by which the fluids of both the primary fuel and the main fuel are utilized as media for transferring heat energy released by the combustion of the fuels to the multiple jets of the thermocompressor; the said main combustion chamber being enclosed within tubular coils in which coils the primary and main fuels are vaporized and superheated before being injected into the thermocompressor.

11. A jet propulsion engine comprising: a tubular shell having primary, main and pilot fuel inlets and a fuel vapor actuated multiple jet thermocompressor air injection means in its forward section to discharge fuel gas and air into a main combustion chamber in its rearward section; means providing a primary fuel combustion space, the said space being intermediate the pilot burner and the main combustion chamber; the said pilot burner providing a pilot flame for continuous ignition to the primary combustion space and also providing heat to maintain a portion of said thermocompressor at a high temperature; and means by which the heat released by the pilot burner is added to the heat of the primary fuel gas to do work in the thermocompressor jets; the said main combustion chamber being enclosed within tubular coils in which coils the primary and main fuels are vaporized before being injected into the thermocompressor.

12. A jet propulsion engine comprising a tubular shell having a fuel vapor actuated multiple jet thermocompressor air injection means in the forward section to discharge hot main fuel gas and air into a main combustion chamber in its rearward section, a pilot burner providing a continuous pilot flame, a primary fuel injection nozzle heated by the pilot flame, means forming a primary air injector in which an annular jet of hot primary fuel gas entrains and forces a quantity of air into an annular space formed between a tubular primary fuel feed line and a tubular nozzle in which annular space the mixed stream of fuel gas and air may be ignited by the pilot flame and burned or exploded in such a manner as to cause the gaseous products to be spouted rearwardly forming a high-velocity motivating force in the thermocompressor, the main combustion chamber being enclosed within tubular coils in which coils the primary and main liquid fuels are vaporized and superheated before being injected into the thermocompressor.

13. A jet propulsion engine comprising a tubular shell having a fuel vapor actuated multiple jet thermocompressor air injection means in the forward section to discharge hot main fuel gas and injected air into a main combustion chamber in its rearward section, a pilot burner providing a continuous pilot flame, a primary fuel injection nozzle heated by the pilot flame, a tubular primary fuel feed line and a tubular nozzle positioned and arranged to provide an annular space therebetween, means forming a primary air injector in which an annular jet of hot fuel gas entrains and forces a quantity of air into an annular space formed between the tubular primary fuel feed line and the tubular nozzle and wherein the mixed stream of fuel gas and air may be ignited by the pilot flame and burned or exploded in such a manner as to cause the products to be spouted rearwardly forming a high-velocity motivating force in the thermocompressor, means by which oxygen may be injected with the entrained air so that the oxygen content of the mixture is raised making the mixture more capable of explosive reaction, the main combustion space enclosed within tubular coils in coils in which the primary and main liquid fuels are vaporized and superheated before being injected into the thermocompressor.

14. In a jet propulsion engine, a tubular shell, an air injection means in the forward section of the shell and a combustion chamber in its rearward section, a tubular conduit passing through the combustion chamber for conducting gaseous fuel from heating coils in the combustion zone to a fuel injection nozzle in the forward section, means providing a sleeve member in the forward portion of said combustion chamber for slidably supporting said tubular conduit in such a manner as to allow freedom of movement in thermal expansion, ports communicating between said tubular conduit and said supporting sleeve member through which a quantity of said gaseous fuel may be by-passed directly into the combustion chamber thereby increasing the flow rate through the said tubular conduit and decreasing the quantity of heat absorbed per unit mass of fuel passing therethrough, means providing for the support of said tubular conduit in such a manner that its thermal expansion lengthwise will open said communicating ports to by-pass an amount of fuel depending upon the temperature of the conduit, thus preventing said temperature from exceeding a designed level.

15. A jet propulsion engine comprising a tubular shell having an inlet ram at its forward end, a combustion chamber in its rearward portion, a thermocompressor main fuel and air injection means in upstream relation to the combustion chamber and having main fuel supply pipes leading thereto, an island member forming an annular diffuser section, said island member being slidably supported in the inlet portion of the shell and securely fastened to the forward end of the main fuel supply pipes so that thermal expansion of the pipes will move the island member to positions effecting the best ram-air compression through said air inlet, the said combustion chamber being enclosed within tubular coils in which the primary and main fuels are vaporized and superheated before being injected into the thermocompressor.

16. A jet propulsion engine comprising a tubular shell having a primary and a main fuel inlet therein and a fuel vapor energized multiple jet thermocompressor air injection means in its forward section to discharge fuel gas and air into a main combustion chamber in its rearward section, a pilot burner, means providing a primary high velocity combustion flame positioned intermediate the pilot burner and the main combustion chamber, whereby the said primary combustion products will forcibly inject chain carriers into the main combustion chamber thereby inducing a branched chain reaction, means by which the fluids of both the primary fuel and the main fuel are utilized as media for transferring heat energy released by the combustion of the fuels to motivating jets actuating the thermocompressor, the combustion chamber being enclosed within tubular coils in which coils the primary and main fuels are vaporized and superheated before being injected into the thermocompressor.

17. In an engine in combination: a main fuel combustion system comprising a main fuel supply, means for vaporising and superheating the main fuel, a main injector for entraining and forcing the superheated fuel and air into a main combustion chamber and an exit jet propulsion nozzle extending from the main combustion chamber; a primary fuel combustion system comprising a primary fuel supply, means for vaporizing the primary fuel into a gas and for endothermically reforming the gas into a highly explosive mixture, a primary jet nozzle, means providing for an exothermic reversal combustion reaction of the said reformed gas in a primary combustion space in the primary jet nozzle, means for conducting the products of the exothermic combustion from the primary nozzle at high velocities into the throat of the main air injector; and a pilot-burner combustion system consisting of a fuel supply, an oxidizer supply, a pilot-burner combustion chamber juxtaposed the primary combustion system and means to initiate combustion; the products of combustion of the pilot-burner system and the primary fuel system being mixed as they flow into and through the primary jet nozzle and thence into the main combustion chamber.

WALTER HOBART WILSON.

References Cited in the file of this patent

UNITED STATES PATENTS

| Number | Name | Date |
|---|---|---|
| 2,268,464 | Seippel | Dec. 30, 1941 |
| 2,502,332 | McCollum | Mar. 28, 1950 |
| 2,540,594 | Price | Feb. 6, 1951 |
| 2,556,161 | Bailey et al. | June 12, 1951 |